United States Patent Office 3,419,890
Patented Dec. 31, 1968

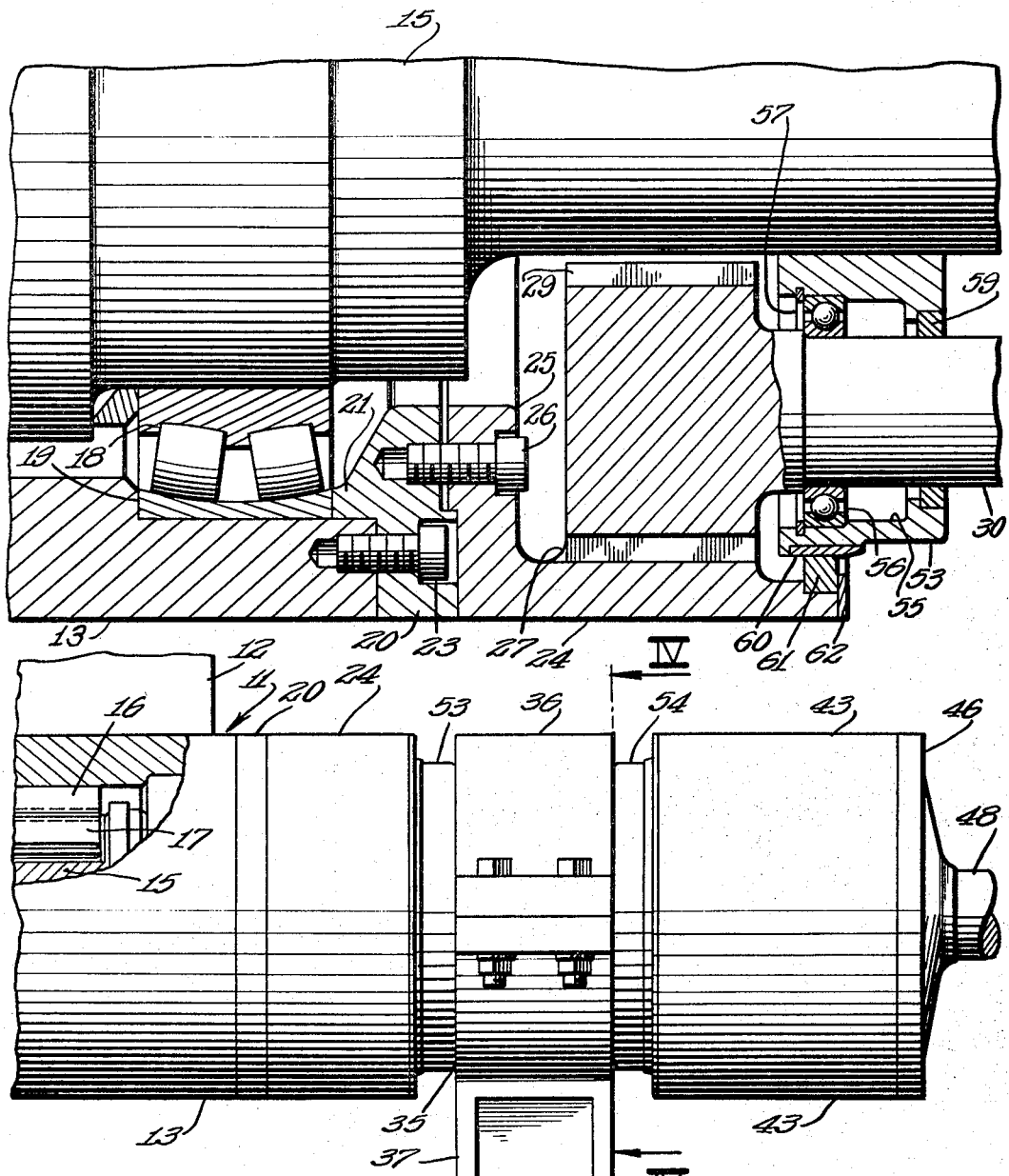

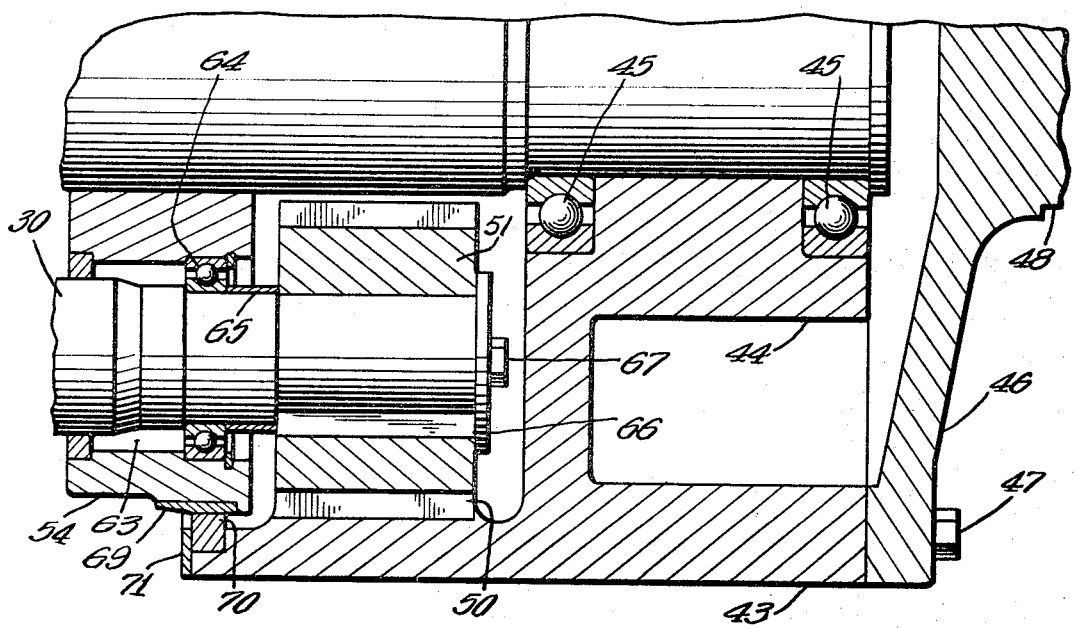
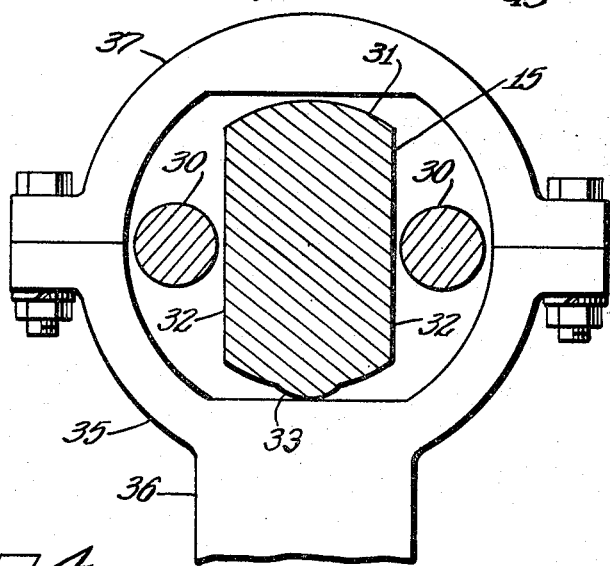

3,419,890
CROWN ROLL DRIVE
Edgar J. Justus, Beloit, Wis., assignor to Beloit Corporation, Beloit, Wis., a corporation of Wisconsin
Filed Nov. 18, 1965, Ser. No. 508,447
5 Claims. (Cl. 29—115)

ABSTRACT OF THE DISCLOSURE

Support and drive for controlled deflection roll in which controlled nip pressure is obtained between a roll couple, and the drive to the roll is around the support for the roll. The roll is in the form of a shell supported on a stationary center shaft on self-aligning bearings. The center shaft is rockingly supported at one end in a stationary housing, accommodating bending of the shaft about its opposite ends by the nip correcting pressures acting against the shaft. The drive is in the form of spaced internal gears journalled on the center shaft, on opposite sides of the support for the center shaft and geared drive connections between the internal gears journalled in cages supported on opposite sides of the support for the center shaft.

Summary and objects of the invention

The present invention relates to improvements in controlled deflection rolls, in which a controlled nip pressure is obtained between a roll couple, and more particularly relates to an improved support and drive for the roll.

A principal object of the present invention is to provide an improved drive to a controlled deflection roll arranged with a view toward utmost compactness and efficiency in construction.

A further object of the invention is to improve upon the drives for controlled deflection rolls heretofore in use, by providing a simplified drive to the roll extending along the outside of the center shaft for the roll and within the peripheral limits of the roll.

A further object of the invention is to improve upon the supports and drives for controlled deflection rolls by rotatably supporting the roll on its stationary center shaft by driving the roll around the support for the center shaft and within the peripheral limits of the roll, and supporting the center shaft to accommodate deflection thereof about its opposite ends, in which the center shaft forms a support for the drive members for the roll and at least one support for the center shaft is intermediate the drive train for the roll.

Still another object of the invention is to provide an improved form of controlled deflection roll having a stationary center shaft forming a reaction member for the nip correcting pressures on the roll, in which bending of the shaft by the nip correcting pressures on the roll is compensated for by journalling the roll on the shaft on spherical self-aligning bearings and supporting the shaft on supports rockable about axes extending transversely of the axis of rotation of the roll, and by driving the roll by a drive member journalled on the shaft outside of one of the supports therefor, and connecting the drive member to the roll through geared drive trains, extending along the outside of the shaft and within the peripheral limits of the roll.

These and other objects of the invention will appear from time to time as the following specification proceeds and with reference to the accompanying drawings wherein:

FIGURE 1 is a fragmentary view in side elevation of the drive end of a controlled deflection roll supported and driven in accordance with the principles of the present invention, with certain parts of the roll broken away and certain other parts shown in longitudinal section;

FIGURE 2 is a fragmentary horizontal sectional view taken through a portion of the roll and its center shaft and showing the driving end of the geared drive train to the roll;

FIGURE 3 is a horizontal sectional view somewhat similar to FIGURE 2 and forming a continuation of FIGURE 2 and showing the roll drive end of the geared drive train to the roll; and FIGURE 4 is a fragmentary sectional view taken substantially along line IV—IV of FIGURE 1.

In FIGURES 1 and 2 of the drawings, I have shown a controlled crown roll assembly 11, which operates in a roll couple with a second roll 12, as in my application Ser. No. 339,998 filed Jan. 24, 1964 and now Patent No. 3,276,102 dated Oct. 4, 1966. The roll assembly 11 includes an elongated hollow cylindrical roll shell 13 having an inner stationary core or center shaft 15 extending through the center thereof and beyond opposite ends thereof. The center shaft 15 may be hollow for a portion of the length thereof, to accommodate the passage of fluid pressure lines thereinto, to pressurize a crown controlling pressure shoe 16 and to receive lubricating lines (not shown) for lubricating the roll shell bearings. The crown controlling pressure shoe 16 is radially extensible from the periphery of the center shaft 15 into slidable engagement with the inner surface of the roll shell 13. The shoe is rockably mounted on a rectangular piston 17, recessed within the center shaft and extending for substantially the length thereof, as in my aforementioned application Ser. No. 339,998. The pressure shoe 16, the piston 17, the mounting for the piston in the center shaft 13, for extensible movement with respect thereto, and the fluid pressure means for applying fluid under pressure to the piston to extend the piston with respect to the periphery of the center shaft form no part of the present invention, except insofar as they apply a bending reaction to the center shaft 15, so need not herein be shown or described further.

The center shaft 15 may be held from rotation to hold the center of the shoe 16 exactly at the nip between the rolls 12 and 13, in any conventional manner.

The roll shell 13 is shown in FIGURE 3 as being supported at one end on the shaft 15 of a self-aligning bearing 18, herein shown as being a spherical roller bearing. The opposite end of the roll shell 13 is supported on a similar bearing (not shown) in a similar manner. As herein shown, the outer race of the self-aligning bearing 18 is recessed within the shell 13 and is retained in engagement with a shouldered abutment 19 in said roll shell, as by a drive and retainer ring 20, having an axially extending flanged portion 21 abutting the outer end of the outer race of the roll shell bearing 18, and retained to said roll shell as by cap or machine screws 23, extending therethrough and threaded in the end of said roll shell. A drive casing 24, having a cylindrical periphery forming a continuation of the outer periphery of the roll shell 13, abuts the outer end of the drive ring 20 and forms an outward continuation thereof. The drive casing 24 has a radially inwardly extending flanged portion 25, extending inwardly along the outer face of the drive ring 21 and secured thereto, as by machine screws 26, to rotatably drive said drive ring and the roll shell 13.

The drive casing 24 is shown as having an internal gear 27 formed integrally therewith. The internal gear 27 is meshed with and driven from diametrically spaced pinions 29, 29 on the inner ends of shafts 30, 30, spaced radially outwardly of the center shaft 15 and extending therealong in parallel relation with respect thereto.

The center shaft 15 has an intermediate portion 31 having opposite flattened sides 32 providing clearance for the shafts 30, 30.

The intermediate portion of the shaft 15 has a depending boss 33 in the form of a section of a sphere, rockingly engaging a flat bearing surface 34 formed in a base 35 of a pedestal 36. The pedestal 36 is of a split construction and is closed by a cap 37. The opposite end of the center shaft 15 is rockably supported in a similar manner in a support (not shown) similar to the support pedestal 37.

A drive casing 43, having a generally cylindrical periphery has an internal hub 44 journalled on the outer end of the center shaft 15 on anti-friction bearings 45. The drive casing 43 has an end plate 46, abutting the outer end thereof and secured thereto as by machine screws 47, or any other suitable securing means. The end plate 46 has an integrally formed shaft portion 48 extending outwardly therefrom, coaxially with the axis of rotation of the roll shell 13, and forming a drive member for the drive casing 43. The shaft 48 may be driven from a conventional drive coupling, which may be a flexible coupling.

Spaced axially inwardly of the hub 44, on the internal cylindrical surface of the drive member 43, is an internal gear 50 shown as being formed integrally with said drive member, but which may also be keyed or otherwise secured thereto. The internal gear 50 meshes with and drives diametrically opposed pinions 51, 51 on the outer ends of the diametrically opposed shafts 30, 30.

The shafts 30, 30 are rotatably journalled on opposite sides of the support 36 for the center shaft 15 in cages 53 and 54, suitably secured to the center shaft 15 and extending thereabout.

The cage 53 has diametrically opposed hollow bearing support portions 55 opening through said cage and forming supports for an anti-friction bearing 56 supporting and journalling the shaft 30 in said cage. A snap ring 57 is snapped in the hollow bearing support portion 55 to retain the bearing 56 thereto. A seal 59, having sealing engagement with the shaft 30, is recessed in the opposite end of the hollow bearing support portion 55, to seal the bearing 56 from dust and to retain lubricant thereto. The cage 53 also has a bearing ring 60 extending thereabout within the drive member 24 and abutted by a seal 61, carried in said drive member and retained thereto as by an end ring 62. The cage 54 is similar to the cage 53 and has diametrically opposed hollow bearing support portions 63 opening to opposite sides thereof and forming bearing supports for anti-friction bearings 64 for the shafts 30. The inner races of the bearings 64 are abutted by the inner ends of spacers 65, abutting the inner sides of the pinions 51. The pinions 51 are shown as being keyed to the shafts 30 and retained thereto as by retainer caps 66, secured to the end of the shaft 30, as by machine or cap screws 67.

The cage 54 like the cage 53, extends within the drive casing 43 and has an annular portion extending therein having a bearing 69 seated thereon, engaging a seal member 70 partially recessed within the inner end of the drive casing 43, and retained thereto as by a retainer ring 71.

The drive plate 46 and drive casing 43 being rotatably driven about the center shaft 15 on the anti-friction bearings 45, will thus drive the diametrically opposed shafts 30, 30 the pinions 29, 29 on the inner ends thereof and the internal gear 27 and roll shell 13. The drive to the roll shell is thus along each side of the center shaft 15 and within the radial limits of the roll shell 13.

The roll shell 13 being supported on the center shaft 15 on self-aligning spherical roller bearings 18, and the center shaft 15 being rockably supported at its opposite ends, is thus free to bend about its ends as the nip correcting pressures react against the center thereof, and the drive to the roll shell along the outside of the center shaft 15 thus conforms to bending of the center shaft and effects a compact and efficient drive, driving the roll shell in all conditions of bending, effected by the reactions of the crown correcting pressures thereon.

While I have herein shown and described one form in which the invention may be embodied, it may readily be understood that various variations and modifications in the invention may be attained without departing from the spirit and scope of the novel concepts thereof.

I claim as my invention:

1. A controlled deflection roll forming a pressure nip with a second roll comprising:

a cylindrical roll shell, a non-rotatable center shaft extending axially along the center of said roll shell and having nip correcting cooperation therewith, self-aligning bearing means rotatably supporting said roll shell on said center shaft at opposite ends of said roll shell, support means for said center shaft outside of said roll shell and supporting said center shaft for bending about its opposite ends by the nip correcting pressures reacting thereagainst, and drive means for said shell, supported on said shaft and including, a drive member rotatably journalled on said center shaft coaxial with the axis of rotation of said roll shell, and gear and pinion drive connections rotating on an axis offset from the roll shell axis between said drive member and said roll shell within the radial limits of said roll shell and driving said roll shell from said drive member and around one of said support means.

2. A controlled deflection roll forming a pressure nip with a second roll comprising:

a cylindrical roll shell, a non-rotatable center shaft extending axially along the center of said roll shell and having nip correcting cooperation therewith, self-aligning bearing means rotatably supporting said roll shell on said center shaft at opposite ends of said roll shell, rockable support means for said center shaft supporting said center shaft for bending about its opposite ends by the nip corecting pressures reacting on said center shaft, a drive member rotatably journalled on said center shaft for rotation about an axis coaxial with the axis of rotation of said roll shell, and on the outside of said support means, coupling means coaxial with the axis of said roll shell inside of said support means and having drive coupling with said roll shell, and a geared drive connection rotating on an axis offset from the roll shell axis from said drive member to said coupling means, disposed outside of the limits of said center shaft and within the radial limits of said roll shell.

3. A controlled deflection roll in accordance with claim 2, wherein the geared drive connection comprises:

internal gear teeth on said drive member, an internal gear on the inside of said support means for said center shaft between said support means and said roll shell and forming said coupling means for driving said roll shell, and coaxially connected longitudinally spaced pinions rotatably supported on said center shaft and meshing with said internal gears for driving said roll shell from said drive member.

4. A controlled deflection roll forming a pressure nip with a second roll comprising:

a cylindrical roll shell, a non-rotatable center shaft extending axially along the center of said roll shell and having nip correcting cooperation therewith, self-aligning bearing means rotatably supporting said roll shell on said center shaft at opposite ends of said roll shell, support means for opposite end portions of said center shaft, supporting said center shaft for rockable movement about axes extending transversely of said center shaft, to accommodate bending of said center shaft about its opposite ends by the nip correcting pressures reacting thereagainst, drive means for said roll shell including a drive member rotatably journalled on said center shaft, means disposed beyond the end of said center shaft for rotatably driving said drive member, a geared drive connection from said drive member to said roll shell disposed alongside of said center shaft along the outside of said center shaft and one of said support means, and within the limits of said roll shell comprising:

two parallel shafts extending along opposite sides of said center shaft, an internal gear and pinion drive connection from said drive member to said parallel shafts, an internal gear and pinion drive connection from said shafts to said roll shell, and all of the elements of said drive connections being within the radial limits of said roll shell and driving said roll shell around the support for said center shaft.

5. In a controlled deflection roll and in combination with a pressure roll forming a pressure nip therewith, a cylindrical roll shell, a center shaft extending along said roll shell and having nip correcting cooperation therewith, self-aligning bearing means at opposite ends from said roll shell rotatably supporting said roll shell on said center shaft, rockable supports for said center shaft spaced beyond the ends of said roll shell and supporting the end portions of said center shaft to accommodate bending thereof by the reactions of the nip correcting loads thereon, a drive member journalled on one end of said center on the outside of a rockable support therefor, for rotation about an axis coaxial with the axis of rotation of the roll shell, and internal gear and pinion drive connections rotating on an axis offset from the roll shell axis on opposite sides of said rockable support for said center shaft, drivingly connecting said drive member to said roll shell and extending along said rockable support, and driving said roll shell in inwardly spaced relation with respect to the periphery of said roll shell.

References Cited

UNITED STATES PATENTS

| | | |
|---|---|---|
| 2,845,696 | 8/1958 | Bourgues. |
| 2,950,507 | 8/1960 | Keyser _____ 29—116 X |
| 2,995,046 | 8/1961 | Mansacha _____ 74—665 X |
| 3,276,102 | 10/1966 | Justus _____ 29—116 |
| 3,286,325 | 11/1966 | Justus _____ 100—170 X |
| 3,290,897 | 12/1966 | Kuehn _____ 29—115 X |

LOUIS O. MAASSEL, *Primary Examiner.*

U.S. Cl. X.R.

29—116; 100—170, 172